US012801385B2

(12) United States Patent
Ho et al.

(10) Patent No.: US 12,801,385 B2
(45) Date of Patent: Nov. 17, 2026

(54) BRANCH PREDICTION FOR ERROR CHECKING BRANCHES IN A FUNCTION

(71) Applicant: HUAWEI TECHNOLOGIES CO., LTD., Shenzhen (CN)

(72) Inventors: Man Pok Ho, Kanata (CA); Bryan Pak Kwai Chan, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 18/394,224

(22) Filed: Dec. 22, 2023

(65) Prior Publication Data

US 2025/0208871 A1 Jun. 26, 2025

(51) Int. Cl.
*G06F 9/30* (2018.01)
*G06F 8/41* (2018.01)

(52) U.S. Cl.
CPC ............ *G06F 9/30058* (2013.01); *G06F 8/41* (2013.01); *G06F 9/30061* (2013.01)

(58) Field of Classification Search
None
See application file for complete search history.

(56) References Cited

U.S. PATENT DOCUMENTS 5,655,122 A * 8/1997 Wu ...................... G06F 8/4441 717/152
5,790,778 A * 8/1998 Bush .................. G06F 11/3612 714/34
6,378,087 B1 * 4/2002 Flanagan ............ G06F 11/3672 714/E11.212
2004/0025080 A1 * 2/2004 Gardner ................ G06F 9/3865 714/25
2008/0244544 A1 * 10/2008 Neelakantam .......... G06F 8/443 717/147

(Continued)

FOREIGN PATENT DOCUMENTS

WO WO-9806019 A2 * 2/1998 .......... G06F 11/3608

OTHER PUBLICATIONS

Bodik et al., "Interprocedural Conditional Branch Elimination," ACM, 1997. (Year: 1997).*

(Continued)

*Primary Examiner* — Ryan D. Coyer

(57) ABSTRACT

The present disclosure provides methods for intra-procedural return value analysis and inferred error code analysis during whole program optimization. The first method includes identifying, within each function among multiple functions, the conditional branches leading to return blocks. These branches are then examined to ascertain whether they serve as error-checking branches. If a branch is determined to be an error-checking branch, the method includes collecting the values that the function returns when this error-checking branch fails its task. The second method includes recognizing functions that use an enumeration (enum) type for their return data types and grouping these identified functions by return types. Within each of these functions, the method identifies conditional branches that lead to return blocks, and determines if they are error-checking branches. When a branch is classified as an error-checking branch, the corresponding enum values returned by the function during a failed error-checking operation are collected.

19 Claims, 5 Drawing Sheets

(56) References Cited

U.S. PATENT DOCUMENTS

| | | | | |
|---|---|---|---|---|
| 2012/0304160 | A1* | 11/2012 | Soeder | G06F 9/4486 717/148 |
| 2014/0096114 | A1* | 4/2014 | Koren | G06F 11/3466 717/128 |
| 2015/0363203 | A1* | 12/2015 | Lipasti | G06F 9/3848 712/240 |
| 2016/0140030 | A1* | 5/2016 | Ghosh | G06F 11/0793 717/132 |
| 2017/0123797 | A1* | 5/2017 | Friedmann | G06F 9/30054 |
| 2019/0012174 | A1* | 1/2019 | Grant | G06F 9/3848 |
| 2021/0240476 | A1* | 8/2021 | Kountanis | G06F 9/3844 |
| 2025/0061046 | A1* | 2/2025 | Dwars | G06F 11/364 |

OTHER PUBLICATIONS

Bush et al., "A static analyzer for finding dynamic programming errors," Wiley, 2000. (Year: 2000).*

Kimura et al., "Does Return Null Matter?," IEEE, 2014. (Year: 2014).*

Yoshizawa et al., "Logic Error Detection System based on Structure Pattern and Error Degree," ASTES, 2019. (Year: 2019).*

Ball, Thomas, and James R. Larus entitled "Branch prediction for free." (ACM SIGPLAN Notices 28, No. 6 (1993)).

Jan Hubicka, "Update probabilities in predict. def to match reality", Jun. 7, 2016.

Marek Majkowski, "Branch predictor: How many if's are too many? Including x86 and M1 benchmarks!", May 6, 2021.

* cited by examiner

BRANCH PREDICTION FOR ERROR CHECKING BRANCHES IN A FUNCTION

CROSS-REFERENCE TO RELATED APPLICATIONS

This is the first application filed for the present disclosure.

FIELD OF THE INVENTION

The present disclosure pertains to the field of computer compiler optimization, and in particular to methods and apparatus for enhancing the accuracy of branch prediction for error checking branches in a function.

BACKGROUND

Static branch prediction, a technology that emerged during the early days of processor development, has significantly evolved with various innovative methodologies influencing its growth.

One such method is utilized by the GNU Compiler Collection (GCC), which uses return values from certain functions to predict whether a specific path in the code, or "branch", will be taken. It relies on hardcoded rules or "heuristics" to anticipate that paths leading to a null pointer, negative value, or constant value are less likely to be followed, assuming that successful execution typically computes a specific value.

An alternative strategy for static branch prediction involves using branch conditions for prediction. In this method, the compiler checks for conditions like a pointer being equal to NULL or an integer equal to −1 and predicts that branches with such conditions are less likely to be taken. This approach assumes that errors, which these conditions typically represent, do not occur often.

However, both methods of static branch prediction have limitations. The first struggles when zero, TRUE/FALSE, or enumerated types indicate success or failure. The second method encounters difficulties when branches involve conditions other than comparing pointers to NULL or integers to −1. It fails when an integer equals a constant or when zero, denoting FALSE in C/C++, is involved in the decision-making process, thereby confusing the compiler about the path of successful execution.

Therefore, there is a need for methods and apparatus for branch prediction for error checking branches in a function that obviate or mitigate one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

The present disclosure provides methods for intra-procedural return value analysis and inferred error code analysis during whole program optimization. Intra-procedural return value analysis seeks to enhance branch prediction accuracy by identifying and grouping basic blocks that return specific error codes. This is achieved by spotting values that signify errors within functions and subsequently studying the conditional branches that lead to these blocks for error-checking conditions. When found, these branches are marked as unlikely to be taken. In the aspect of inferred error code analysis, the method considers interconnections between various functions and focuses on conditions that inspect for errors, like pointer comparison against NULL or checks against system call failures.

Using a step-by-step procedure, the approach begins at a function call site, compares return values to specific values, and if a match is found, conveys this perceived error code to the invoked function. Within this function, branches leading to this error code are examined and predicted as less likely to be traversed, optimizing the entire application's execution.

In accordance with an aspect of the present disclosure, there is provided a method for compiling computer readable instructions. The method includes receiving a plurality of computer readable instructions which includes a plurality of functions. For each of the plurality of functions, a basic block of the function that causes a return from the function is identified. Furthermore, a conditional branch jumping to the basic block is identified. The method further includes determining that a condition tested by the conditional branch is an error return value. Subsequently, error return values of the function are collected.

In some embodiments, the method for compiling computer readable instructions further includes grouping the conditional branches of each of the plurality of functions by respective return values of each of the conditional branches. For each of the conditional branches, the method further includes determining that the respective return value is one of the collected error return values. Subsequently, the conditional branch is tagged as being unlikely to be taken.

In some embodiments, the error return value is one of a NULL pointer, a −1, or a system call failure value.

In some embodiments, the error return value is one of an enumeration data type.

In some embodiments, the method for compiling computer readable instructions further includes grouping the conditional branches of each of the plurality of functions by respective return values of each of the conditional branches. For each of the conditional branches, the method further includes determining that the respective return value is one of the collected error return values. Subsequently, the conditional branch is tagged as being unlikely to be taken.

In accordance with an aspect of the present disclosure, there is provided a method of branch prediction. The method includes comparing a return value from a callee function against a specific value at a call site of the callee function. The comparison leads to a block of code that is only executed when an unexpected error condition occurs, or a prescribed or a pre-determined condition is triggered. The method further includes determining that the specific value is not expected to be returned by the callee function when the block of code is regarded as cold, i.e., as not frequently executed. Subsequently, the specific value is propagated as an error code to the callee function from a caller function. Within the callee function, all conditional branches leading to the return of the error code are identified as not likely to be taken.

In accordance with another aspect of the present disclosure, there is provided an apparatus for branch prediction. The apparatus includes a processor and a tangible, non-transitory computer readable memory configured to perform a method as defined in any one of aforementioned methods.

In accordance with another aspect of the present disclosure, there is provided a non-transitory computer readable medium having instructions recorded thereon to be performed by at least one processor to execute (or carry out) a method as defined in any one of aforementioned methods.

Embodiments have been described above in conjunction with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
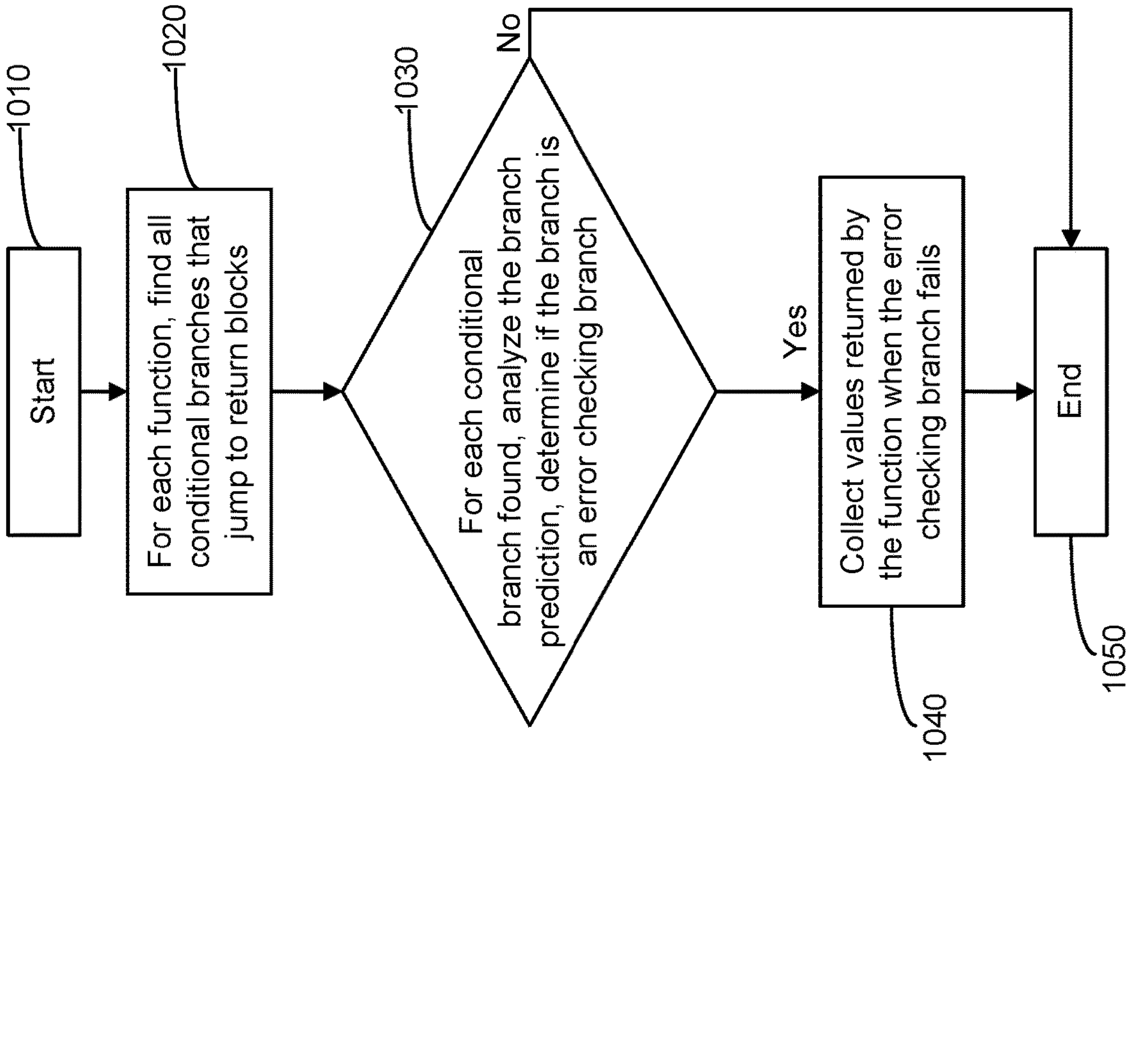
FIG. 1 illustrates a method of conducting intra-procedural return value analysis, according to an embodiment.

Basic block (BB), as used herein, refers to a sequential segment of code without any branches or branch targets, i.e., the execution enters at the beginning and will run to the end without the possibility of branching off to another part of the code.

Caller and callee, as used herein, refers to a case that if a Function A instigates a function call to a Function B, then Function A is designated as the caller and Function B becomes the callee.

Conditional branch, as used herein, refers to a branch that is taken only if a specific requirement or condition is met. If the requirement or condition remains unfulfilled, then the execution program proceeds by transitioning to the subsequent instruction after the branch.

Enumeration type (enum), as used herein, refers to a distinct data type consisting of named values, providing a way for developers to assign names to integral constants that make a program easier to read and maintain.

Error checking branch, as used herein, refers to a conditional diversion utilized to check for the success or failure of a computation. It is often scripted in the form of if-then declarations in advanced programming languages.

Error code, as used herein, typically refers to an integer value (commonly −1, 0, 1) or another data type (for example, a pointer or a floating-point number) used to communicate an error state or an error condition that has occurred within a function to the function's invoker (e.g., the caller of the function).

A function return value, as used herein, refers to the outcome (e.g., a value) produced and passed back to the function caller (e.g., the invoker of the function), typically as a means to relay the results of a certain calculation or computation produced by the function, or to signify the success or failure of the function's execution.

GCC, as used herein, is a suite of programming compilers produced by the GNU Project. It supports various programming languages, including C, C++, Objective-C, Fortran, Ada, and others. GCC plays an integral role in transforming written code into a format that the computer can execute directly.

Intermediate representation (IR), as used herein, refers to a form of program representation used within compilers, which often sits between the source code and machine code. This abstract coding language is designed to facilitate analysis and transformations before generating the final machine code.

Link time optimization (LTO), as used herein, refers to a method in compiler design that enables the compiler to apply optimizations to a program considering the entire program as a whole. With LTO enabled, the compiler has a holistic view of the application, allowing it to perform more extensive optimizations.

Static branch prediction, as used herein, and was introduced to minimize the performance penalty that occurred when a branch was taken in the program. Static branch prediction is a method utilized by computer processors to anticipate the potential outcome of a conditional operation, which can lead to different subsequent steps or "branches". The distinguishing characteristic of this method is its static nature, which means that once a prediction is made, it remains unchanged throughout the execution of the program.

This prediction scheme often relies on basic rules. One such rule might be to predict that backward branches will be taken, under the assumption that they are loops intended to execute multiple times. Conversely, forward branches could be predicted not to be taken. Another approach might be to consistently predict a branch as either taken or not taken, regardless of its nature. Over time, the technology has advanced and incorporated several innovative methodologies, leading to current solutions that can make use of return values and branch conditions to enhance the branch prediction process.

Unlike dynamic branch prediction, static branch prediction does not always require additional hardware resources, which can make it a more straightforward and economical solution. However, its effectiveness may be heavily dependent on the nature of the code being executed. In general, static branch prediction can be highly efficient in certain scenarios, though it may be less accurate than dynamic branch prediction techniques. This is primarily because dynamic branch prediction can adjust its predictions based on the recent behavior of branches, potentially providing a higher level of accuracy for diverse and complex code structures. Despite this, static branch prediction continues to be a vital technique in processor design due to its simplicity and the fact that it doesn't add to hardware complexity.

Performance penalty, as used herein, refers to a performance penalty in the context of computer science typically refers to an additional time cost or processing delay that is incurred due to certain computational circumstances or design decisions.

In the context of branching, a performance penalty is typically incurred when the processor's prediction about a branch is incorrect (a "misprediction"). The processor, having guessed the wrong branch, needs to backtrack and correct its mistake. This involves undoing speculative work, reloading the instruction pipeline, and then executing the correct branch, all of which take additional time-thus slowing down overall processing speed. This delay, or slowdown, is referred to as the branch misprediction penalty.

For instance, one existing solution involves the use of return values for branch prediction, a method utilized by the gcc compiler. The gcc compiler employs hardcoded heuristics, specifically PRED_NULL_RETURN, PRED_NEGATIVE_RETURN, and PRED_CONST_RETURN, to anticipate branch behavior. Notably, hardcoded heuristics are predefined rules embedded within the software to help anticipate certain outcomes, for example, PRED_NULL_RETURN predicts that branches leading to paths returning a NULL pointer are less likely to be taken. Similarly, PRED_NEGATIVE_RETURN assumes branches returning a negative value are less probable, while PRED_CONST_RETURN suggests branches resulting in constant values are not usually followed.

The hardcoded heuristics employed by the gcc compiler are designed to optimize branch prediction based on the type of return values. They operate under the fundamental premise that a successful execution path typically produces a value computed at runtime, whereas failure paths yield a NULL pointer, negative, or constant values. Accordingly, the gcc compiler uses these heuristics to infer branch directions, predicting that branches leading to blocks returning these specific values are less likely to be taken. This approach is informed by the higher likelihood of successful code execution and thus assumes such branches to be untaken. As a result, these heuristics play a pivotal role in enhancing the efficiency of branch prediction by considering the likely success of different code paths.

In embodiments a function may return a value other than a NULL or a negative value to signal an error to the caller. In fact, some functions use zero to indicate success, and others use it to denote failure (depending on the programmer's definition). Furthermore, many functions return a TRUE/FALSE value to the caller to indicate success or failure, and the heuristic that simply assumes functions don't usually return a constant value is not always accurate. Lastly, when enum values are used to specify success or failure, gcc may not correctly handle the error checking branches.

In embodiments, an alternative methodology for static branch prediction can be employed. This strategy involves the use of branch conditions for prediction. The heuristics include comparisons of pointers against NULL, integer comparisons against −1, and verification of whether the successor block contains a call or return statement. For instance, a conditional branch is predicted as not taken if the branch condition involves a pointer being equal to NULL. This is based on the fact that pointers are usually not NULL.

Moreover, this approach identifies branches with conditions such as pointer comparison against NULL and integer comparison against −1 as error checking branches. Given that errors don't occur frequently, the heuristics naturally assume that the branches with these conditions are likely not taken.

However, not all branches involve pointer comparisons against NULL or integer comparisons against −1. For example, when a branch checks if an integer is equal to a specific constant value, then the heuristics cannot be applied. Additionally, since 0 represents FALSE in C/C++ and is often used to indicate clear, embodiments including a compiler should be able to determine whether an integer comparison against 0 is intended to be true for the success path.

Notably, both existing solutions as described above are configured to operate on a branch-by-branch basis and do not make use of their correlations.

Aspects of the disclosure presents methods and apparatus for enhancing the accuracy of branch prediction for error checking branches in a function through an approach known as "return value analysis". In essence, this analysis focuses on the return values generated by a function when an error occurs.

An embodiment of this concept can be demonstrated through the following sample code (i.e., all the branches are correctly predicted, assuming no error occurs during execution):

```
int function( )
{
 int *pointer = malloc(size);
 if (pointer == NULL)
  return 1;
 if (helper__function1( ) == 0) // helper__function1 returns 0 on failure
   return 1;
 if (helper__function2( ) == 1) // helper__function2 returns 1 on failure
   return 1;
 return 0;
}
```

Referring to the sample code, the function first allocates memory of a specific size and assigns the address to a pointer. If memory allocation fails (i.e., malloc( ) returns NULL), the function immediately returns 1, indicating an error. Subsequent calls are made to two helper functions, both of which have specific return values when an error occurs (0 and 1 respectively). If either helper function encounters an error, the main function immediately returns 1 to signal this. If no errors are detected during execution, the function returns 0, denoting a successful execution. Of note, is that even through helper_function1( ) returns 0 on failure and helper_function2( ) returns a 1 on failure, in both cases the function( ) returns a 1 to indicate these errors as well as when the call to malloc fails. In other words, various error codes such as NULL, 1, and 0, all cause function( ) to return the same value, a 1.

Another embodiment of this concept can be demonstrated through the following sample code (i.e., a test case to verify whether an optimizing compiler implements an embodiment):

```
int function( )
{
 int *pointer = malloc(size);
 if (pointer == NULL)
  return 1;
 if (helper__function1( ) == 0) // helper__function1 returns 0 on failure
 {
   printf("helper__function1 returns 0\n");
   return 1;
 }
 return 0;
}
```

When the $2^{nd}$ if statement's return value is changed, and if the resultant code layout (which is affected by the static branch prediction), then the compiler has implemented return value analysis:

```
int function( )
{
 int *pointer = malloc(size);
 if (pointer == NULL)
  return 1;
 if (helper__function1( ) == 0) // helper__function1 returns non-zero on failure
 {
   printf("helper__function1 returns 0\n");
   return 0;   // the return value indicates that this function communicates a
       // different value to the caller
 }
 if (helper__function2( ) == 1) // helper__function2 returns 1 on failure
   return 1;
 return 0;
}
```

The structure of the second sample code is similar to that of the first sample code, but it includes an additional printf ( ) statement to output a message when helper_function1( ) fails, or in other words, when a 0 is returned by helper_function1, which, in this example, indicates a non-error condition. The returned value from this function, like the first code, is 1. Referring to the second sample code, the function returns a 0 (indicating successful execution) when helper_function1( ) encounters an error, rather than a 1. This alters the return value used to communicate with the caller. Also, another helper_function2( ) is included, which returns 1 upon failure.

Return value analysis, may provide a mechanism to predict branch behavior based on the specific return values of a function when an error is encountered. The core premise of this approach is that a particular return value, such as a failure or error, from a function typically carries the same meaning to the caller. So, if a specific value is returned in response to a fatal error, all other branches that return this same value are likely not taken.

Methods described herein may also assume that branches that lead to paths returning the same error value are also performing error checks. This implies that the returned value could signal potential error checks in other branches. This concept may be used across compilers that generate code from source code, where function return values may be used as a medium of communication between callers and the functions themselves.

Several factors contribute to the effectiveness of return value analysis. For instance, functions with error-checking branches often call lower-level APIs and system calls, with execution continuing until an error arises. Once this occurs, the function usually performs error logging, frees up memory buffers to avoid leaks, and returns an error status.

Furthermore, at a program level, enum types may be used to encode success and failure statuses of function calls, forming part of the API contract between functions to communicate execution status. A successful return value, defined as the value returned by a function in the absence of errors during execution, can be propagated up and down a call graph during Inter-Procedural Analysis/Link-Time Optimization (IPA/LTO).

The practical use of successful return value propagation spans four primary areas. One is Intra-procedural return value analysis. This analysis focuses on individual functions, identifying the likely return values (success or failure) based on the function's internal structure and operations. This information is then used to predict which conditional branches within the function are likely or unlikely to be executed. A second is caller expected success return code propagation. This technique analyzes the caller function's perspective, determining how it interprets the success return codes from the functions it calls. This understanding helps in optimizing the caller function's branch predictions based on the expected return values. A third is callee expected success return code propagation. Conversely, this approach takes the viewpoint of the callee function, determining how it is expected to return success codes to its caller functions. This information assists in optimizing the branch predictions within the callee function itself. A fourth is enum return types analysis. This analysis is specialized for functions that use enum types for their return values. By identifying the specific enum values that signify success or failure, it provides another dimension of information for predicting conditional branch behaviors in these functions.

The methods can even extend to handling functions that return the same user-defined data type at the IPA level. In such scenarios, if a certain value signals an error, branches in other functions that return the same value are considered unlikely to be taken, thus enhancing prediction accuracy.

FIG. 1 illustrates a flowchart of a method for conducting an intra-procedural return value analysis, according to an embodiment. This method initiates at step 1010, marking the beginning of the intra-procedural return value analysis. At step 1020, each function is inspected to identify all conditional branches leading to return blocks. At step 1030, for every detected conditional branch, the branch predictions are analyzed to decide whether it functions as an error checking branch, and consequently, an outcome is produced. If the result is affirmative, i.e., "yes", the function's return values are gathered in the event of an error-checking branch failure at step 1040. However, if the result is negative, i.e., "no", the analysis is concluded at step 1050.

Figure 2:
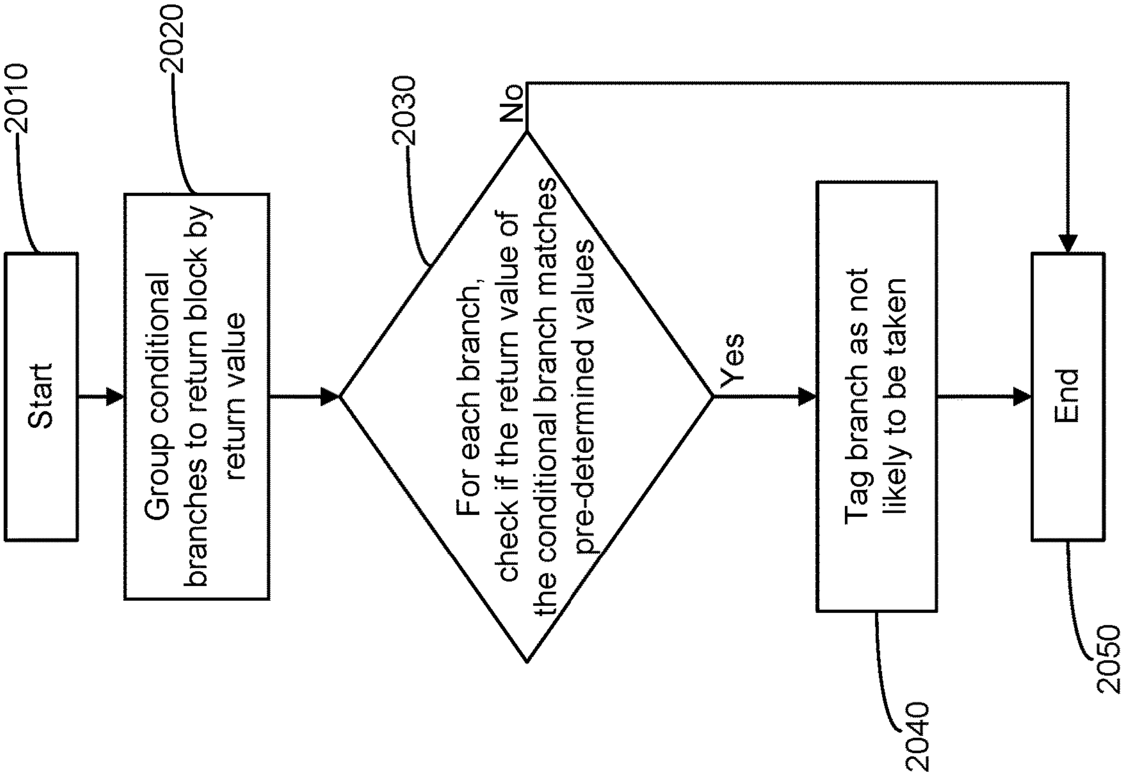
FIG. 2 illustrates a method of conducting intra-procedural return value analysis, according to an embodiment.

FIG. 2 also illustrates a flowchart of a method for conducting intra-procedural return value analysis, according to an embodiment. The method commences at step 2010, marking the start of the analysis. Following this, at step 2020, conditional branches that lead to return blocks are categorized or grouped based on their return value. At step 2030, each branch is assessed to see if its return value matches or aligns with pre-determined values such as, for example, any of the values compiled or collected at step 1040, as described in FIG. 1, subsequently deriving a result. In case of a "yes" result, i.e., when a branch has a return value that does match or align with pre-determined values, the branch or branches in question are labeled as unlikely to be taken at step 2040. However, when a branch has a return value that does not match or align with pre-determined values, the process is concluded at step 2050.

In summary, intra-procedural return value analysis may improve the accuracy of predicting conditional branches leading to basic blocks that return specific error codes upon encountering an error. The method involves identifying values that represent errors within a function, then grouping the basic blocks that return from the function by return value, assuming these are known at compile time. From there, conditional branches leading to these blocks are identified and scrutinized for error-checking conditions. If an error-checking condition is found, the corresponding return value may be identified as an error code. Lastly, other branches returning the same error code may be marked as unlikely to be taken. The method may also retains the expected success and failure return values for each analyzed function for future LTO analysis. This process is repeated for each function to ensure comprehensive analysis and efficient branch prediction across the application.

Figure 3:
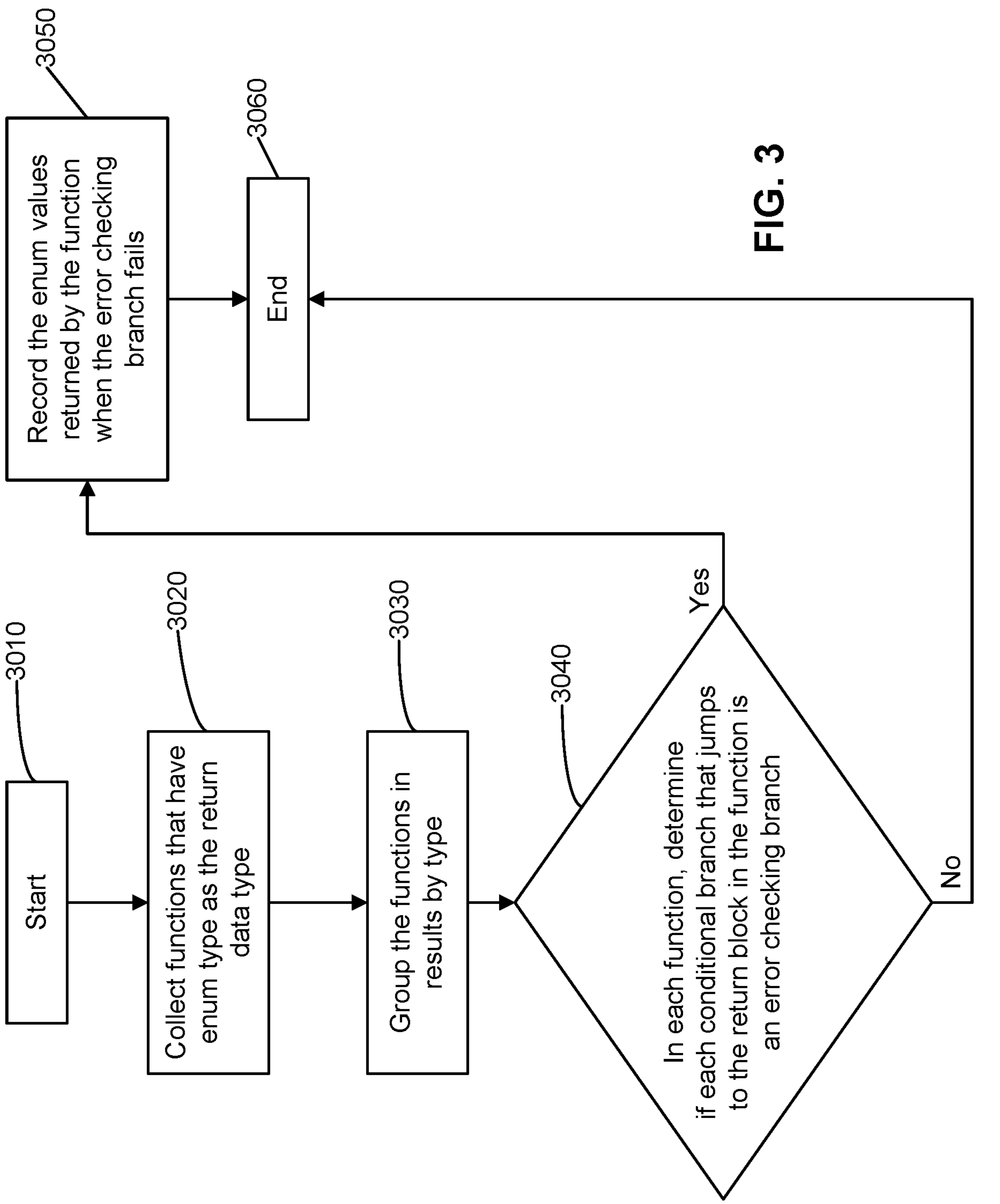
FIG. 3 illustrates a method of conducting inferred error code analysis during whole program optimization (LTO), according to an embodiment.

FIG. 3 illustrates a flowchart of a method of conducting inferred error code analysis during whole program optimization (LTO), according to an embodiment. The method initiates at step 3010, denoting the onset of the analysis. Subsequently, at step 3020, functions characterized by an enumeration (enum) type as their return data type are compiled or collected. At step 3030, the functions derived from the previous step are categorized (grouped) based on their type. At step 3040, for each of these functions, it is determined if each conditional branch that leads to the return block in the function acts as an error-checking branch, subsequently generating an outcome. If this outcome is affirmative, or "yes", the enum values returned by the function when the error-checking branches fail are logged or collected at step 3050. However, if the outcome is negative, or "no", the analysis is concluded at step 3060.

Figure 4:
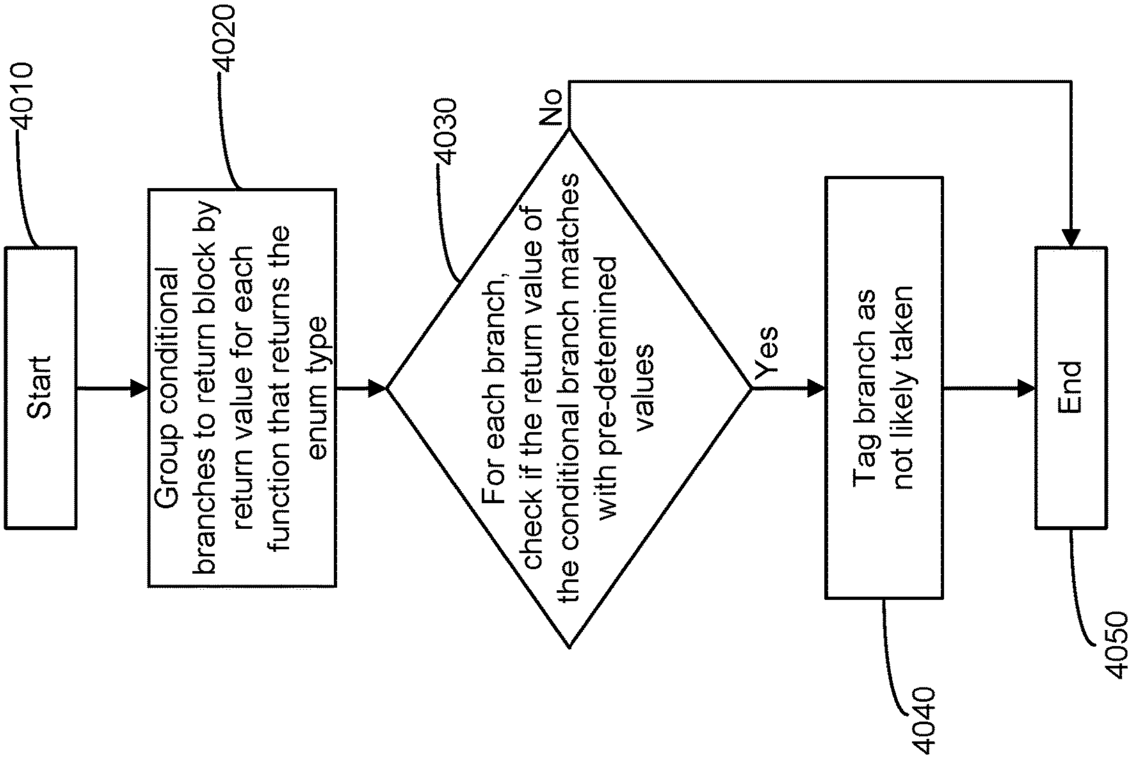
FIG. 4 illustrates a method of conducting inferred error code analysis during whole program optimization (LTO), according to an embodiment.

FIG. 4 illustrates a flowchart of method of conducting inferred error code analysis during whole program optimization (LTO), according to an embodiment. The method initiates at step 4010, denoting the onset of the analysis. At step 4020, conditional branches that lead to the return block for each function returning the enum type are grouped by their return value. At step 4030, for each branch, it is determined if the return value of the conditional branch matches or aligns with pre-determined values such as, for example, any one of the values collected at step 3050, as described in FIG. 3, subsequently deriving a result. If this result is affirmative, or "yes", the branch is tagged or labelled as unlikely to be taken at step 4040. However, if the result is negative, or "no", the analysis is concluded at step 4050.

In summary, the goal of inferred error code analysis during whole program optimization (LTO) is to predict the values representing errors across the entire application, not just within individual functions. It also groups basic blocks that return from the function by enum return value, but in this case, it takes into account the interconnections and interactions between different functions in the application. The focus here is on branches that lead to these blocks on a program-wide level, looking for conditions that check for errors. These conditions may include pointer comparison against NULL, integer comparison against −1, encoded as enums. It may also check for system call failures. The method may mark branches returning error values as unlikely to be taken and stores the expected success and failure return values for each function for further program optimization. This holistic approach contributes to a more accurate branch prediction throughout the entire application.

In some embodiments of the present disclosure, compiler predictions for seldom executed blocks of code (cold blocks of code) may be improved. For example, at a call site of a specific function, the specific function's return value may be compared against a specific value. If this comparison prompts a jump to a block of code identified as a cold block, it may then be presumed that the function will not likely return this particular value. As used herein, a cold block is a basic block that is unlikely to be executed and it may be assumed that the purpose of the cold block is to be executed in case a function returns an error. Subsequently, the specific value, interpreted as an error code, may be communicated to the called function. Following this, within the called function that has accepted the transmitted error code, all conditional branches that could culminate in the return of this error code are determined and are predicted as not taken. The method operates on the assumption that these branches are unlikely to be traversed, given that the error code is not typically returned. This approach refines the overall computation and execution of the function within the present disclosure.

Figure 5:
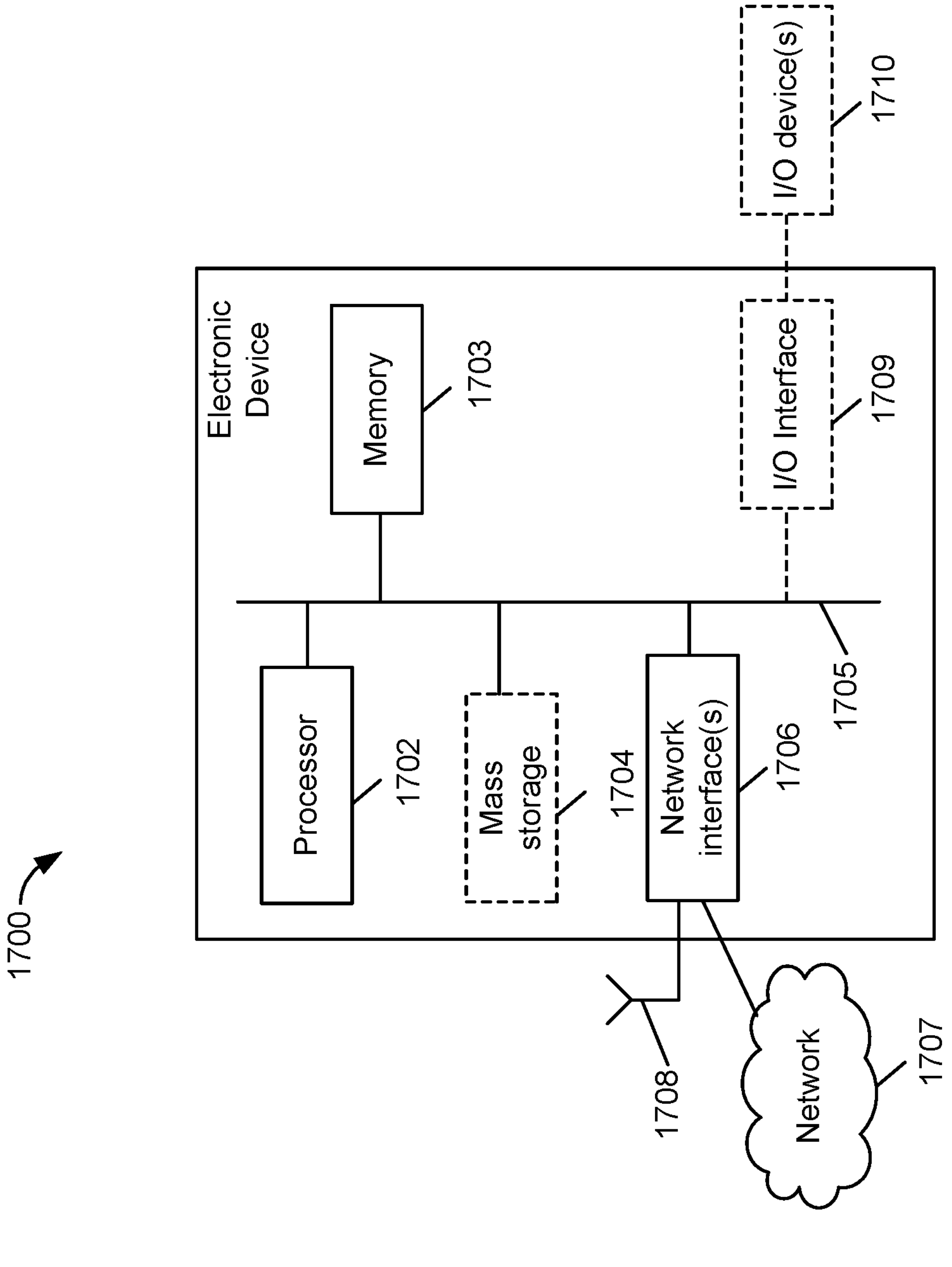
FIG. 5 illustrates an electronic device that may be configured to perform any of the methods as described herein, according to an embodiment.

FIG. 5 is a schematic diagram of a computing device 500 that may perform any of the methods describe herein. It should be noted that computing devices 500 may include microcontrollers, microprocessors, or other processing units which execute program instructions stored in memory, or other digital or analog circuitry, or a combination thereof.

As shown, the device includes a processor 510, such as a Central Processing Unit (CPU) or specialized processors such as a Graphics Processing Unit (GPU) or other such processor unit, memory 520, non-transitory mass storage 530, I/O interface 540, network interface 550, and a transceiver 560, all of which are communicatively coupled via bi-directional bus 570. According to certain embodiments, any or all of the depicted elements may be utilized, or only a subset of the elements. Further, the device 500 may contain multiple instances of certain elements, such as multiple processors, memories, or transceivers. Also, elements of the hardware device may be directly coupled to other elements without the bi-directional bus.

The memory 520 may include any type of non-transitory memory such as static random access memory (SRAM), dynamic random access memory (DRAM), synchronous DRAM (SDRAM), read-only memory (ROM), any combination of such, or the like. The mass storage element 530 may include any type of non-transitory storage device, such as a solid state drive, hard disk drive, a magnetic disk drive, an optical disk drive, USB drive, or any computer program product configured to store data and machine executable program code. According to certain embodiments, the memory 520 or mass storage 530 may have recorded thereon statements and instructions executable by the processor 510 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer readable medium products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, cloud device, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method for compiling computer readable instructions, the method comprising:
- receiving a plurality of computer readable instructions including a plurality of functions; and
- for each function of the plurality of functions:
  - identifying a basic block of the function that causes a return from the function;
  - identifying a conditional branch jumping to the basic block;
  - determining that a condition tested by the conditional branch returned an error return value;
  - collecting the error return value of the function;
  - comparing a return value from a callee function with a value at a call site of the callee function, wherein the comparison leads to a block of code that is only executed when an unexpected error condition occurs;
  - determining that the specific value is not expected to be returned by the callee function when the block of code is regarded as cold;
  - propagating the specific value as an error code to the callee function from a caller function; and
  - within the callee function, identifying all conditional branches leading to the return of the error code as not likely to be taken.

2. The method of claim 1 further comprising:
- grouping the conditional branches of each of the plurality of functions by respective return values of each of the conditional branches;
- for each of the conditional branches, determining that the respective return value is one of the collected error return value; and
- tagging the conditional branch as being unlikely to be taken.

3. The method of claim 1 wherein the error return value is one of a NULL pointer, a −1, or a system call failure value.

4. The method of claim 1 wherein the error return value is an enumeration data type error return value.

5. The method of claim 4 further comprising:
- grouping the conditional branches of each of the plurality of functions by respective return values of each of the conditional branches;
- for each of the conditional branches, determining that the respective return value is one of the collected error return value; and
- tagging the conditional branch as being unlikely to be taken.

6. An apparatus for compiling computer readable instructions, the apparatus comprising:
- a processor and a tangible, non-transitory computer readable memory;
- wherein the apparatus is configured to:
  - receive a plurality of computer readable instructions including a plurality of functions;
  - for each of the plurality of functions:
    - identify a basic block of the function that causes a return from the function;
    - identify a conditional branch jumping to the basic block;
    - determine that a condition tested by the conditional branch is an error return value; and
    - collect error return value of the function;
    - compare a return value from a callee function with a value at a call site of the callee function, wherein the comparison leads to a block of code that is only executed when an unexpected error condition occurs;
    - determine that the specific value is not expected to be returned by the callee function when the block of code is regarded as cold;
    - propagate the specific value as an error code to the callee function from a caller function; and
    - within the callee function, identify all conditional branches leading to the return of the error code as not likely to be taken.

7. The apparatus of claim 6, wherein the apparatus is further configured to:
- group the conditional branches of each of the plurality of functions by respective return values of each of the conditional branches;
- for each of the conditional branches, determine that the respective return value is one of the collected error return value; and
- tag the conditional branch as being unlikely to be taken.

8. The apparatus of claim 6, wherein the error return value is one of a NULL pointer, a −1, or a system call failure value.

9. The apparatus of claim 6, wherein the error return value is one of an enumeration data type.

10. The apparatus of claim 9, wherein the apparatus is further configured to:
- group the conditional branches of each of the plurality of functions by respective return values of each of the conditional branches;
- for each of the conditional branches, determine that the respective return value is one of the collected error return values; and
- tag the conditional branch as being unlikely to be taken.

11. A non-transitory computer readable memory, the memory having a compiler including compiler instructions recorded thereon to be executed by at least one processor, to cause the compiler to:

receive function instructions, the function instructions including a plurality of functions;

for each function of the plurality of functions:

identify a basic block of the function that causes a return from the function;

identify a conditional branch jumping to the basic block;

determine that a condition tested by the conditional branch is an error return value;

collect the error return value of the function;

compare a return value from a callee function with a value at a call site of the callee function, wherein the comparison leads to a block of code that is only executed when an unexpected error condition occurs;

determine that the specific value is not expected to be returned by the callee function when the block of code is regarded as cold;

propagate the specific value as an error code to the callee function from a caller function; and within the callee function, identify all conditional branches leading to the return of the error code as not likely to be taken.

12. The non-transitory computer-readable memory of claim 11, wherein the instructions further cause the processor to:

group the conditional branches of each of the plurality of functions by respective return values of each of the conditional branches;

for each of the conditional branches, determine that the respective return value is one of the collected error return values; and tag the conditional branch as being unlikely to be taken.

13. The non-transitory computer-readable memory of claim 11, wherein the error return value is one of a NULL pointer, a −1, or a system call failure value.

14. The non-transitory computer-readable memory of claim 11, wherein the error return value is an enumeration data type error return value.

15. The non-transitory computer-readable memory of claim 14, wherein the instructions further cause the processor to:

group the conditional branches of each of the plurality of functions by respective return values of each of the conditional branches;

for each of the conditional branches, determine that the respective return value is one of the collected error return values; and tag the conditional branch as being unlikely to be taken.

16. The method of claim 1 wherein the plurality of computer readable instructions are received at link-time optimization.

17. The method of claim 1 wherein the received plurality of functions returns an error code.

18. The method of claim 1 wherein whole program optimization is performed for each internal structure and operation of each function of the plurality of functions.

19. The method of claim 2 wherein the grouping is performed by whole program optimization, determining is performed by whole program optimization and tagging is performed by whole program optimization.

* * * * *